(12) United States Patent
Holmes (10) Patent No.: US 8,899,395 B2
(45) Date of Patent: Dec. 2, 2014

(54) SELECTABLE ONE-WAY TORQUE TRANSMITTING DEVICE USING CONTROL RAIL

(71) Applicant: GM Global Technology Operations LLC, Detroit, MI (US)

(72) Inventor: Alan G. Holmes, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 159 days.

(21) Appl. No.: 13/746,863

(22) Filed: Jan. 22, 2013

(65) Prior Publication Data

US 2014/0202820 A1     Jul. 24, 2014

(51) Int. Cl.
*F16D 41/16*     (2006.01)

(52) U.S. Cl.
CPC ...................................... *F16D 41/16* (2013.01)
USPC ........................................................ 192/43.1

(58) Field of Classification Search
USPC .................................... 192/43, 43.1, 43.2, 44
See application file for complete search history.

(56) References Cited

U.S. PATENT DOCUMENTS

| | | |
|---|---|---|
| 5,871,071 A | 2/1999 | Sink |
| 5,918,715 A | 7/1999 | Ruth et al. |
| 5,964,331 A | 10/1999 | Reed et al. |
| 6,065,576 A | 5/2000 | Shaw et al. |
| 6,116,394 A | 9/2000 | Ruth |
| 6,125,980 A | 10/2000 | Ruth et al. |
| 6,129,190 A | 10/2000 | Reed et al. |
| 6,186,299 B1 | 2/2001 | Ruth |
| 6,193,038 B1 | 2/2001 | Scott et al. |
| 6,244,965 B1 | 6/2001 | Klecker et al. |
| 6,333,112 B1 | 12/2001 | Field et al. |
| 6,386,349 B1 | 5/2002 | Welch |
| 6,481,551 B1 | 11/2002 | Ruth |
| 6,505,721 B1 | 1/2003 | Welch |
| 6,571,926 B2 | 6/2003 | Pawley |
| RE38,498 E | 4/2004 | Ruth et al. |
| 6,854,577 B2 | 2/2005 | Ruth |
| 7,258,214 B2 | 8/2007 | Pawley et al. |
| 7,275,628 B2 | 10/2007 | Pawley et al. |
| 7,296,668 B2 | 11/2007 | Fetting, Jr. et al. |
| 7,344,010 B2 | 3/2008 | Fetting, Jr. et al. |
| 7,484,605 B2 | 2/2009 | Pawley et al. |
| 7,699,746 B2 | 4/2010 | Maguire et al. |
| 7,721,860 B2 * | 5/2010 | Saka .............................. 192/43.1 |
| 7,878,316 B2 | 2/2011 | Joppeck |
| 8,042,669 B2 * | 10/2011 | Samie et al. .................. 192/43.1 |
| 8,051,959 B2 | 11/2011 | Eisengruber |
| 8,079,453 B2 | 12/2011 | Kimes |
| 8,267,231 B2 * | 9/2012 | Holmes ......................... 192/43.1 |
| 8,272,488 B2 | 9/2012 | Eisengruber et al. |

(Continued)

*Primary Examiner* — Jacob S Scott (57) ABSTRACT

A torque transmitting device for use in an automotive transmission is provided. The device includes a first annular race and a second annular race disposed concentrically around the first annular race. First and second locking elements are pivotally connected to one of the first and second annular races. The first locking element is moveable to rotationally fix the first annular race to the second annular race in a first rotational direction to transfer torque therebetween. The second locking element is moveable to rotationally fix the first annular race to the second annular race in a second rotational direction to transfer torque therebetween, where the second rotational direction is opposite the first rotational direction. A control rail is disposed adjacent to the first and second annular races. The control rail has indentations formed therein and is moveable to allow the torque transmitting device to be selectively engaged.

20 Claims, 3 Drawing Sheets

(56) References Cited

U.S. PATENT DOCUMENTS

| | | |
|---|---|---|
| 8,276,725 B2 | 10/2012 | Swales et al. |
| 8,286,772 B2 | 10/2012 | Eisengruber |
| 2004/0216975 A1 | 11/2004 | Ruth |
| 2005/0279602 A1 | 12/2005 | Ruth |
| 2006/0124425 A1 | 6/2006 | Fetting, Jr. et al. |
| 2006/0249345 A1 | 11/2006 | Ruth |
| 2006/0278486 A1 | 12/2006 | Pawley et al. |
| 2006/0278487 A1 | 12/2006 | Pawley et al. |
| 2006/0278488 A1 | 12/2006 | Pawley et al. |
| 2007/0034470 A1 | 2/2007 | Fetting, Jr. et al. |
| 2007/0056825 A1 | 3/2007 | Fetting, Jr. et al. |
| 2008/0110715 A1 | 5/2008 | Pawley |
| 2008/0135369 A1 | 6/2008 | Meier |
| 2008/0217131 A1 | 9/2008 | Wittkopp et al. |
| 2009/0045024 A1 | 2/2009 | Ruth |
| 2009/0159391 A1 | 6/2009 | Eisengruber |
| 2009/0211863 A1 | 8/2009 | Kimes |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0011694 A1 | 1/2011 | Swales et al. |
| 2011/0100777 A1 | 5/2011 | Wilton et al. |
| 2011/0147155 A1 | 6/2011 | Heitzenrater et al. |
| 2011/0183806 A1 | 7/2011 | Wittkopp et al. |
| 2011/0192693 A1 | 8/2011 | Bradley |
| 2011/0192697 A1 | 8/2011 | Prout et al. |
| 2011/0214962 A1 | 9/2011 | Shaw et al. |
| 2011/0233026 A1 | 9/2011 | Pawley |
| 2011/0297500 A1 | 12/2011 | Shaw et al. |
| 2012/0115663 A1 | 5/2012 | Wilton et al. |
| 2012/0145505 A1 | 6/2012 | Kimes |
| 2012/0152683 A1 | 6/2012 | Kimes |

\* cited by examiner

SELECTABLE ONE-WAY TORQUE TRANSMITTING DEVICE USING CONTROL RAIL

FIELD

The present disclosure relates to a torque transmitting component for an automatic transmission, and more particularly, to a torque transmitting device having a control rail.

BACKGROUND

The statements in this section merely provide background information related to the present disclosure and may not constitute prior art.

There are many devices for transmitting torque known in the art. Examples include hydraulically actuated clutch plates, dog clutches actuated by shift forks, one-way clutches, and selectable one-way clutches. These devices are able to transmit torque between two separate components, and each is useful for its intended purpose.

The one-way clutch is used in many applications for transmitting torque in one rotational direction. A typical one-way clutch may include an inner ring disposed within an outer ring. A connecting member is located between the rings for selectively transmitting torque between the rings. The connecting member may take various forms, for example, a sprag, roller, or rocker. The connecting member acts to engage the rings in order to transmit torque when one of the rings is rotated in a first direction relative to the other of the rings. If the rings are rotated in an opposite relative direction, the connecting member does not engage the rings, and torque is not transmitted through the one-way clutch. In this way the one-way clutch is effective in transmitting torque between two components.

One type of brake or clutch useful in automatic transmissions is known as a selectable one-way clutch, which allows different torque settings to be selected. For example, a selectable one-way clutch may include one setting to function as a one-way clutch and another setting which allows the inner ring and the outer ring to rotate freely relative to one another in both directions. In another example, a selectable one-way clutch may include one setting to function as a one-way clutch and another setting which allows torque to be transmitted between the inner ring and the outer ring in both directions. A selectable one-way clutch is similar to a basic one-way clutch, which includes a "locked" mode in one rotational direction and a "freewheel" mode in the opposite rotational direction. In the basic one-way clutch, the operating mode is determined by the direction of the torque being applied to the input member. A selectable one-way clutch is further capable of producing a driving connection between an input member and an output member in one or both rotational directions and is also able to freewheel in one or both rotational directions as needed. As an example, a selectable one-way clutch may be implemented to transfer torque from an engine to the transmission, and to interrupt the transfer of reverse torque from the transmission to the engine.

Selectable one-way clutches in automatic transmissions may employ a high pressure hydraulic control system that is used to actuate the selectable one-way clutch. However, there are applications, such as hybrid electric vehicles, that may not otherwise require a high pressure hydraulic control system. Selectable one-way clutches also often require high spring forces, which may result in a large amount of drag. It is desirable, however, to avoid a large amount of drag in order to improve fuel economy. Accordingly, there exists a need for a low-drag selectable one-way clutch.

SUMMARY

The present disclosure provides a reliable, inexpensive low-drag selectable one-way clutch (or brake) with low actuation force, which improves fuel economy. The selectable one-way clutch (or brake) has individual locking elements that can be blocked from entering pockets on an opposite race member by a control rail, in one or both directions.

In one variation, which may be combined with or separate from the other variations described herein, a torque transmitting device for use in an automotive transmission is provided. The torque transmitting device includes a first annular race and a second annular race disposed concentrically around the first annular race. A first locking element is pivotally connected to either the first or the second annular race, and the first locking element is moveable to rotationally fix the first annular race to the second annular race in a first rotational direction to transfer torque therebetween. A second locking element is also pivotally connected to either the first or the second annular race. The second locking element is moveable to rotationally fix the first annular race to the second annular race in a second rotational direction to transfer torque therebetween, where the second rotational direction is opposite the first rotational direction. A control rail is disposed adjacent to the first and second annular races. The control rail forms a plurality of indentations therein. The control rail is moveable between first, second, third, and fourth positions. In the first position, the first locking element is partially disposed in an indentation of the control rail and the second locking element is partially disposed in an indentation of the control rail. In the second position, the first locking element is partially disposed in an indentation of the control rail and the second locking element is disposed outside of the plurality of indentations of the control rail. In the third position, the first and second locking elements are both disposed outside of the plurality of indentations of the control rail. In the fourth position, the first locking element is disposed outside the plurality of indentations of the control rail and the second locking element is partially disposed in an indentation of the control rail.

In another variation, which may be combined with or separate from the other variations described herein, a torque transmitting device for use in an automotive transmission is provided. The torque transmitting device includes a first annular race and a second annular race disposed concentrically around the first annular race. One of the first and second annular races defines an annular groove therein. A first locking element is pivotally connected to one of the first and second annular races, and the first locking element moveable to rotationally fix the first annular race to the second annular race in a first rotational direction to transfer torque therebetween. A second locking element is pivotally connected to one of the first and second annular races, and the second locking element is moveable to rotationally fix the first annular race to the second annular race in a second rotational direction to transfer torque therebetween, the second rotational direction being opposite the first rotational direction. An annular control rail is disposed in the annular groove. The annular control rail forms a plurality of indentations therein. The annular control rail is moveable within the groove to prevent one or both of the first and second locking elements from rotationally fixing the first annular race to the second annular race.

In yet another variation, which may be combined with or separate from the other variations described herein, a torque transmitting device for use in an automotive transmission is provided. The torque transmitting device includes a first annular race and a second annular race disposed concentrically around the first annular race. A first locking element is pivotally connected to one of the first and second annular races, and the first locking element is moveable to rotationally fix the first annular race to the second annular race in a first rotational direction to transfer torque therebetween. A second locking element is pivotally connected to one of the first and second annular races, and the second locking element is moveable to rotationally fix the first annular race to the second annular race in a second rotational direction to transfer torque therebetween, where the second rotational direction is opposite the first rotational direction. An annular control rail is disposed adjacent to the first annular race and the second annular race. The annular control rail has at least one protrusion extending therefrom. The protrusion has a first ramped surface on a first side and a second ramped surface on a second side. The annular control rail forms a first indentation adjacent to the first ramped surface and a second indentation adjacent to the second ramped surface. The annular control rail is moveable to prevent the first and second locking elements from rotationally fixing the first annular race to the second annular race.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
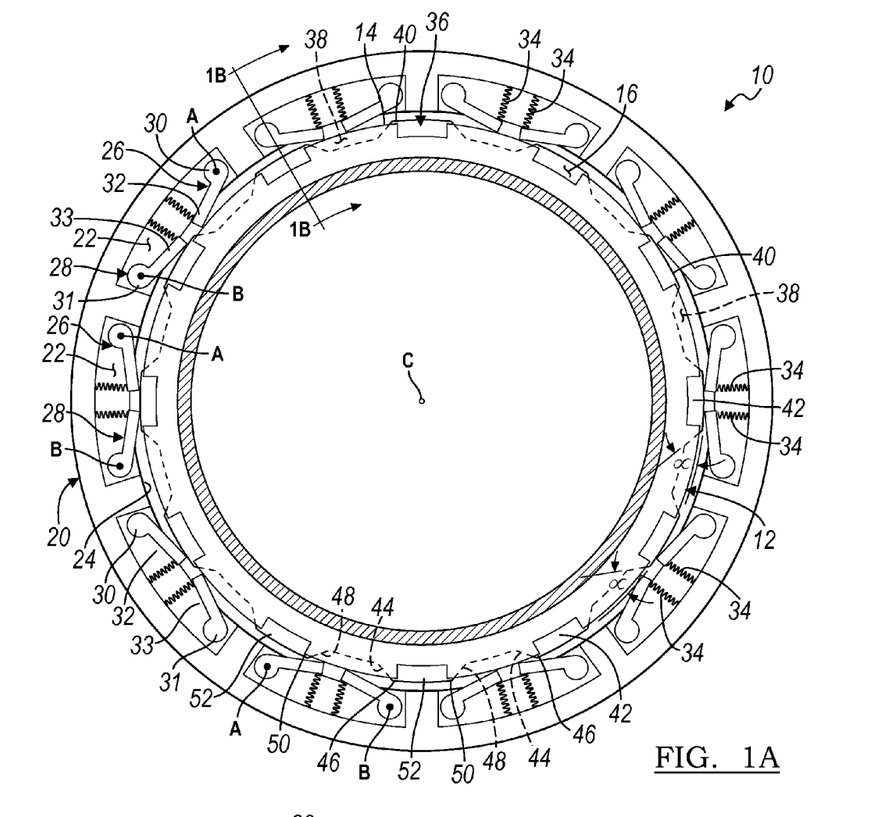
FIG. 1A is a cross-sectional side view of a torque transmitting mechanism according to the principles of the present disclosure.
Figure 1B:
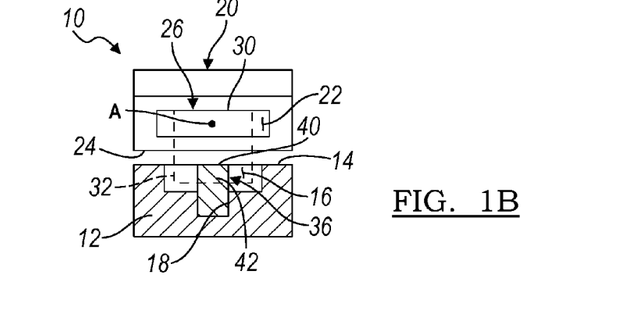
FIG. 1B is a cross-sectional view of the torque transmitting mechanism of FIG. 1A, taken along the line 1B-1B, in accordance with the principles of the present disclosure.

With reference to FIGS. 1A and 1B, a selectable one-way torque transmitting mechanism or device is schematically and cross-sectionally illustrated and generally designated at 10. The selectable one-way torque transmitting mechanism 10 may be used as a clutch or a brake in an automotive transmission. The torque transmitting mechanism 10 includes an inner race 12. The inner race 12 is annular in shape and includes an outer surface 14. A plurality of recesses or pockets 16 are formed in the outer surface 14 and are spaced annularly around the outer perimeter of the inner race 12. An annular groove 18 (see FIG. 1B) is formed in the outer surface 14 of the inner race 12. The annular groove 18 extends around the outer circumference of the inner race 12 and through each of the pockets 16. The groove 18 is formed into the inner race 12 at a depth greater than the depth of the pockets 16.

The torque transmitting device 10 also includes an outer race 20 disposed radially outward from the inner race 12. The outer race 20 is disposed concentrically around the inner race 12. The outer race 20 also has a generally annular shape. The outer race 20 has a plurality of recesses or pockets 22 formed in an inner surface 24 of the outer race 20. The pockets 22 are spaced annularly around the inner circumference of the outer race 20.

A first locking element 26 and a second locking element 28 are disposed within each pocket 22 of the outer race 20. The locking elements 26, 28 may be rockers, sprags, or any other suitable type of locking element 26, 28. In the illustrated embodiment, each of the locking elements 26, 28 includes a pivot body 30, 31 and an arm 32, 33 extending from the pivot body 30, 31. The pivot bodies 30, 31 are pivotally connected to the outer race 20 within the pockets 22. Thus, the pivot bodies 30, 31 remain within the pockets 22 of the outer race 20, but the arms 32, 33 may be rotated about the pivot points A, B such that the arms 32, 33 extend out of the pockets 22 and toward the inner race 12. In some positions of the torque transmitting device 10, the arms 32, 33 extend into the pockets 16 of the inner race 12, while in other positions, the arms 32, 33 are disposed outside of the pockets 16. As will be described in further detail below, the locking elements 26, 28 are designed to selectively transmit torque through the torque transmitting device 10.

A plurality of biasing members 34 is disposed within the pockets 22 of the outer race 22. In the illustrated embodiment, two biasing members 34 are disposed in each of the pockets 22. In the present example, the biasing members 34 are coil springs, but it should be appreciated that various other types of biasing members may be employed. Each biasing member 34 engages one of the arms 32, 33 and urges the arm 32, 33 of the locking element 26, 28 to rotate toward the central axis C of the torque transmitting device 10. In the present example, the first locking element 26 is illustrated as being biased in a counterclockwise direction about the pivot axis A and the second locking element 28 is illustrated as being biased in a clockwise direction about the pivot axis B, but it should be appreciated that the locking elements 26, 28 and biasing members 34 may be oriented in an opposite direction, if desired.

An annular-shaped control rail 36 is disposed adjacent to the inner and outer races 12, 20. The control rail 36 is disposed within the annular groove 18 of the inner race 12 and extends radially outwardly from the annular groove 18. The control rail 36 has a plurality of recesses or indentations 38 formed in an outer surface 40 of the control rail 36. The indentations 38 are spaced apart around the circumference of the control rail 36. The indentations 38 are separated by protrusions 42 that are spaced around the outer circumference of the control rail 36. Each protrusion 42 has a first ramped surface 44 extending from a first side 46 of the protrusion and a second ramped surface 48 extending from a second side 50 of the protrusion 42. Each protrusion 42 has a concave arcuate middle surface 52 disposed between the first and second ramped surfaces 44, 48. Each ramped surface 44, 48 extends at an acute angle $\alpha$ from the middle surface 52. The indentations 38 are located adjacent to the ramped surface 44, 48 of the protrusions 42. Though a specific description of the protrusions 42 has been given in this paragraph, it should be understood, however, that the protrusions 42 could have other configurations, without falling beyond the spirit and scope of the present disclosure.

The control rail 36 is partially disposed within the annular groove 18 and may be slid within the annular groove 18 to rotationally translate the control rail 36 with respect to the inner race 12. The control rail may be rotationally moved by an actuator, by way of example. In FIG. 1A, the control rail 36 is illustrated disposed in a position wherein the control rail 36 prevents the locking elements 26, 28 from rotating into the pockets 16 of the inner race 12, which will be described in further detail below and with reference to FIGS. 2A-2D. In the position of FIG. 1A, the locking elements 26, 28 are biased into contact with the protrusions 42 of the control rail 36, but the locking elements 26, 28 are not biased into the pockets 16 of the inner race 12, in this position. In this position, the control rail 36 may either rotate with the locking elements 26, 28 (which contact the control rail 36) and the outer race 20, or the control rail 36 may slip against the locking elements 26, 28 such that the outer race 20 rotates independently from the control rail 36.

Torque is transmitted through the torque transmitting device 10 when the inner race 12 is rotationally fixed to the outer race 20 by either or both of the first and second locking elements 26, 28 engaging the inner race 12. For example, when the first locking element 26 moves into one of the pockets 16 by the spring force of the biasing element 34, the first locking element 26 engages the inner race 12 in that pocket 16 of the inner race 12. Such engagement occurs when the protrusions 42 of the control rail 36 are slid away from the pockets 16, such that the first locking elements 26 may be biased into the pockets 16, rather than being biased against the control rail protrusions 42. When the first locking element 26 is biased into the pocket 16, the first locking element 26 fixes the outer race 20 to the inner race 12 in one rotational direction to transfer torque between the inner and outer races 12, 20.

In a transmission, the inner and outer races 12, 20 would each be coupled to other components, such as shafts, such that when the races 12, 20 are coupled together, torque is transmitted between the shafts connected to the races 12, 20. In the embodiment of FIG. 1A, when the first locking element 26 is allowed to be biased into one of the pockets 16 (when the protrusions 42 of the control rail 36 are slid out of the way of the pocket 16), the outer and inner races are fixed together for common rotation in one direction, but not the opposite direction. Thus, the outer race 20 is prevented from rotating in a counterclockwise direction, but it may freely rotate in a clockwise direction, in the orientation of FIG. 1A. Thus, engagement by the first locking elements 26 into the pockets 16 rotationally fixes the inner race 12 and the outer race 20 together in one direction. Disengagement of the first locking elements 26 to the inner race 12 occurs when the control rail 36 is slid around the annular groove 18 such that the protrusions 42 block the pockets 16 and push the first locking elements 26 out of the pockets 16, which is illustrated in FIG. 1A.

Torque may also or alternatively be transmitted through the torque transmitting device 10 when the inner race 12 is rotationally fixed to the outer race 20 by the second locking elements 28 engaging the inner race 12. For example, when the second locking elements 28 move into one of the pockets 16 by the spring force of the biasing element 34, the second locking element 28 engage the inner race 12 in that pocket 16 of the inner race 12. When one or more of the second locking elements 28 are biased into the pocket(s) 16, the second locking elements 28 fix the outer race 20 to the inner race 12 in one rotational direction to transfer torque between the inner and outer races 12, 20. In the embodiment of FIG. 1A, when the second locking elements 28 are biased into the pockets 16 (when the protrusions 42 of the control rail 36 are slid out of the way of the pockets 16), the outer and inner races 20, 12 are fixed together for common rotation in one direction, but not the opposite direction. The outer race 20 is prevented from rotating in a clockwise direction, but it may freely rotate in a counterclockwise direction, in the orientation of FIG. 1A. Thus, engagement by the second locking elements 28 into the pockets 16 rotationally fixes the first race 12 and the second race 20 together in one direction. Disengagement of the second locking elements 28 to the inner race 12 occurs when the control rail 36 is slid around the annular groove 18 such that the protrusions 42 block the pockets 16, or a portion of the pockets 16, and push the second locking elements 28 out of the pockets 16, as shown in FIG. 1A.

In sum, the first locking elements 26 transfer torque between the inner and outer races 12, 20 by coupling them together when the outer race 20 is rotated in a counterclockwise direction (in the orientation of FIG. 1A), but the first locking elements 26 do not prevent the outer race 20 from rotating in a clockwise direction. The second locking elements 28 transfer torque between the inner and outer races 12, 20 by coupling them together when the outer race 20 is rotated in a clockwise direction (in the orientation of FIG. 1A), but the second locking elements 28 do not prevent the outer race 20 from rotating in a counterclockwise direction. The control rail 36 is slidable in the groove 18 to uncouple the first and second races 12, 20 by pushing the locking elements 26, 28 out of the pockets 16 of the inner race 12.

Figure 2A:
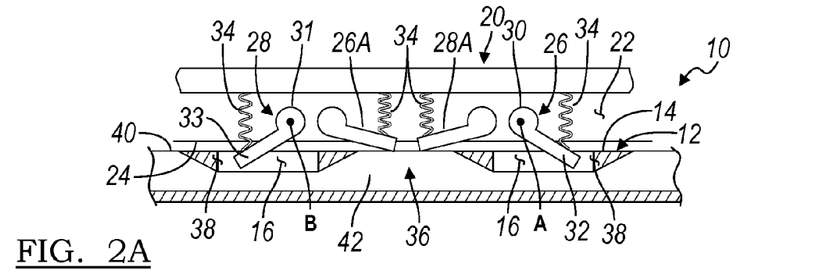
FIG. 2A is a cross-sectional side view of a portion of the torque transmitting mechanism of FIGS. 1A-1B, having a control rail in a first position, according to the principles of the present disclosure.

Referring now to FIGS. 2A-2D, four positions of the control rail 36 will be described. In FIG. 2A, the control rail 36 is illustrated disposed along the groove 18 in a first position. In the first position, the void space of the indentations 38 of the control rail 36 overlaps with the void space of the pockets 16 formed in the inner race 12. Accordingly, each pocket 16 and indentation 38 overlap to form a pocket for the locking elements 26, 28 to enter. Four locking elements 26, 28, 26A, 28A are illustrated. The first and second locking elements 26, 28 are biased into the pockets 16 by the biasing members 34. Thus, in the first position, at least one first locking element 26 is partially disposed in an indentation 38 and a pocket 16 and at least one second locking element 28 is partially disposed in an indentation 38 and a pocket 16. Since the control rail indentations 38 overlap with the pockets 16, the protrusions 42 of the control rail 36 do not force the first and second locking elements 26, 28 out of the pockets 16. Therefore, the first and second locking elements 26, 28 transfer torque between the inner and outer races 12, 20. Because both the first and second locking elements 26, 28 engage the inner race 12, the inner and outer races 12, 20 are coupled in both clockwise and counterclockwise directions; in other words, the inner and outer races 12, 20 are coupled together in both directions such that the inner and outer races 12, 20 rotate together for common rotation regardless of which direction the outer race 20 (or inner race 12) is rotated.

Additional locking elements 26A, 28A are also present in FIG. 2A, but these locking elements 26A, 28A cannot be biased into pockets 16 of the inner race 12 because the pockets 16 are not aligned with the locking elements 26A, 28A.

Figure 2B:
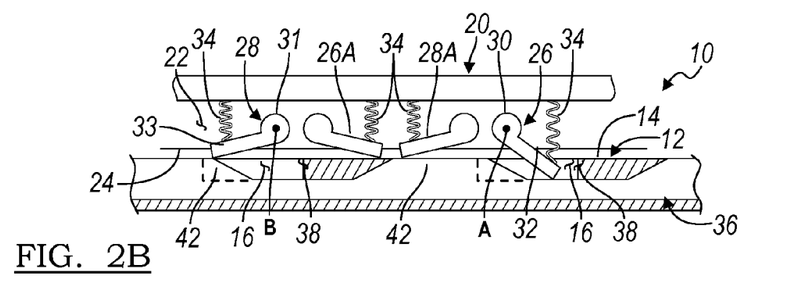
FIG. 2B is a cross-sectional side view of a portion of the torque transmitting mechanism of FIGS. 1A-1B, having a control rail in a second position, in accordance with the principles of the present disclosure.

Referring now to FIG. 2B, the control rail 36 is illustrated disposed along the groove 18 in a second position. The second position of the control rail 36 is different than first position of FIG. 2A. In FIG. 2B, the control rail 36 is slid in the groove 18 so that at least one of the pockets 16 in the inner race 12 is aligned with an indentation 38 of the control rail 36 adjacent to the first locking element 26, such that the first locking element 26 is biased into the pocket 16 by the biasing member 34. Thus, in the second position, the first locking element 26 engages the inner race 12 and prevents the outer race 20 from rotating in a clockwise direction independent of the inner race 12. In other words, the first locking element 26 couples the inner and outer races 12, 20 together for common rotation in a clockwise direction (of outer race 20). Thus, in the second position, at least one first locking element 26 is partially disposed in an indentation 38 and a pocket 16. Since a control rail indentation 38 overlaps with the pockets 16, the protrusions 42 of the control rail 36 do not force the first locking element 26 out of the pocket 16. Therefore, the first locking element 26 transfers torque between the inner and outer races 12, 20.

However, the second locking element 28 is forced against the biasing members 34 by a protrusion 42 of the control rail 36. Thus, in the second position, a protrusion 42 of the control rail 36 blocks the second locking element 28 from entering a pocket 16 of the inner race 12. The protrusion 42 overlaps with a portion of the pocket 16 that is adjacent to the second locking element 28 and prevents the second locking element 28 from entering the pocket 16. Accordingly, the second locking element 28 is disposed outside of the indentations 38 of the control rail 36 and outside of the pockets 16. Thus, the second locking element 28 does not engage the inner race 12. Because only the first locking element 26 engages the inner race 12, the inner and outer races 12, 20 are coupled in one direction but not in an opposite direction. In this example, the inner and outer races 12, 20 are coupled together for common rotation when the outer race 20 moves in a clockwise direction, but the inner and outer races 12, 20 may rotate freely from each other when the outer race 20 is rotated in a counterclockwise direction.

Additional locking elements 26A, 28A are also present in FIG. 2B, but these locking elements 26A, 28A cannot be biased into pockets 16 of the inner race 12 because the pockets 16 are not aligned with the locking elements 26A, 28A.

Figure 2C:
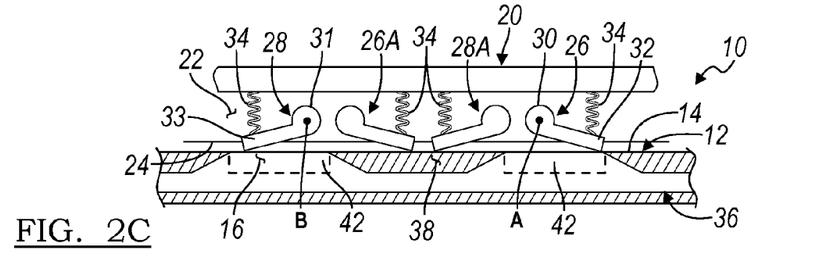
FIG. 2C is a cross-sectional side view of a portion of the torque transmitting mechanism of FIGS. 1A-1B, having a control rail in a third position, according to the principles of the present disclosure.

Referring now to FIG. 2C, the control rail 36 is illustrated disposed along the groove 18 in a third position. The third position of the control rail 36 is different than first position of FIG. 2A and the second position of FIG. 2C. In FIG. 2C, the control rail 36 is slid in the groove 18 so that both the first and second locking elements 26, 28 are forced against the biasing members 34 by protrusions 42 of the control rail 36. Thus, in the third position, one or more protrusions 42 of the control rail 36 block the first and second locking elements 26, 28 from entering a pocket 16 of the inner race 12. The protrusions 42 overlap with the pockets 16 adjacent to both the first and second locking elements 26, 28, preventing the first and second locking elements 26, 28 from entering the pockets 16. Accordingly, the first and second locking elements 26, 28 are disposed outside of the indentations 38 of the control rail and outside of the pockets 16. Neither the first nor the second locking elements 26, 28 engage the inner race 12. Therefore, the torque transmitting device 10 is in neutral and the inner and outer races 12, 20 are free to rotate with respect to each other in either rotational direction. In other words, the inner and outer races 12, 20 are decoupled and freewheeling in the third position of the control rail 36.

Additional locking elements 26A, 28A are also present in FIG. 2C, but these locking elements 26A, 28A cannot be biased into pockets 16 of the inner race 12 because the pockets 16 are not aligned with the locking elements 26A, 28A.

Figure 2D:
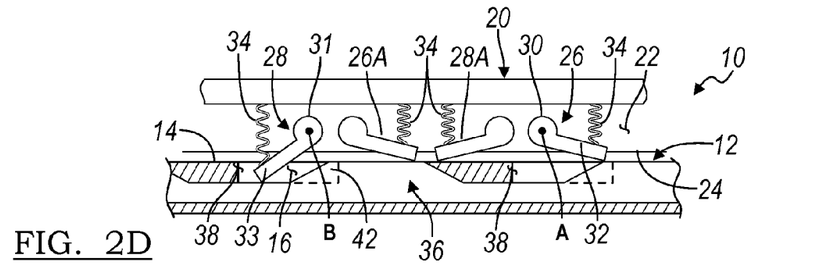
FIG. 2D is a cross-sectional side view of a portion of the torque transmitting mechanism of FIGS. 1A-1B, having a control rail in a fourth position, in accordance with the principles of the present disclosure.

Referring now to FIG. 2D, the control rail 36 is illustrated disposed along the groove 18 in a fourth position. The fourth position of the control rail 36 is different than first position of FIG. 2A, the second position of FIG. 2B, and the third position of FIG. 2C. In FIG. 2D, the control rail 36 is slid in the groove 18 so that at least one of the pockets 16 in the inner race 12 is aligned with an indentation 38 of the control rail 36 adjacent to the second locking element 28, such that the second locking element 28 is biased into the pocket 16 by the biasing member 34. Thus, in the fourth position, the second locking element 28 engages the inner race 12 and prevents the outer race 20 from rotating in a counterclockwise direction independent of the inner race 12. In other words, the second locking element 28 couples the inner and outer races 12, 20 together for common rotation in a counterclockwise direction (of outer race 20). Thus, in the fourth position, at least one second locking element 28 is partially disposed in an indentation 38 and a pocket 16. Since a control rail indentation 38 overlaps with the pockets 16, the control rail 36 does not force the second locking element 28 out of the pocket 16. Therefore, the second locking element 28 transfers torque between the inner and outer races 12, 20.

However, in the fourth position, the first locking element 26 is forced against the biasing members 34 by a protrusion 42 of the control rail 36. Thus, in the fourth position, a protrusion 42 of the control rail 36 blocks the first locking element 26 from entering a pocket 16 of the inner race 12. The protrusions 42 overlap with the pockets 16 adjacent to the first locking elements 26, preventing the first locking elements 26 from entering the pockets 16. Accordingly, the first locking elements 26 are disposed outside of the indentations 38 of the control rail and outside of the pockets 16. Thus, the first locking elements 26 do not engage the inner race 12. Because only the second locking element 28 engages the inner race 12, the inner and outer races 12, 20 are coupled in one direction but not in an opposite direction. In this example, the inner and outer races 12, 20 are coupled together for common rotation when the outer race 20 moves in a counterclockwise direction, but the inner and outer races 12, 20 may rotate freely from each other when the outer race 20 is rotated in a clockwise direction.

Additional locking elements 26A, 28A are also present in FIG. 2D, but these locking elements 26A, 28A cannot be biased into pockets 16 of the inner race 12 because the pockets 16 are not aligned with the locking elements 26A, 28A.

While a single first locking element 26 is illustrated engaging one of the pockets 16 in FIGS. 2A-2B and a single second locking element 28 is illustrated engaging one of the pockets 16 in FIGS. 2A and 2D, it should be understood that a plurality of first locking elements 26 and/or second locking elements 28 may engage the pockets 16. For example, in FIG. 1A, the torque transmitting mechanism is illustrated having ten first locking elements 26 and ten second locking elements 28. Any number or all of these first and/or second locking elements 26, 28 may be used to engage one of the pockets 16 in one of the four positions of the control rail 36.

Figure 3A:
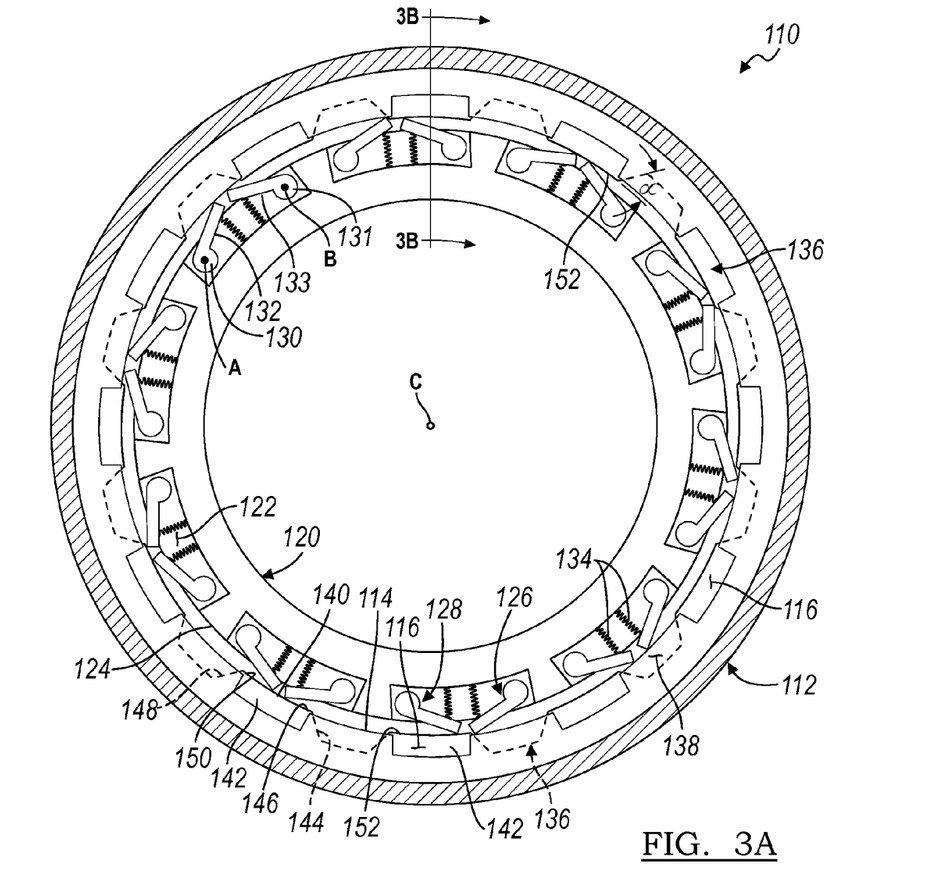
FIG. 3A is a cross-sectional side view of another torque transmitting mechanism according to the principles of the present disclosure.
Figure 3B:
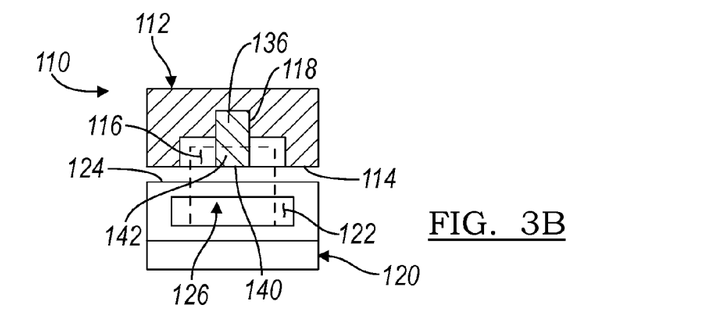
FIG. 3B is a cross-sectional view of the torque transmitting mechanism of FIG. 3A, taken along the line 3B-3B, in accordance with the principles of the present disclosure.

With reference now to FIGS. 3A and 3B, another selectable one-way torque transmitting mechanism or device is schematically and cross-sectionally illustrated and generally designated at 110. The selectable one-way torque transmitting mechanism 110 is an inside-out version of the torque transmitting mechanism 10 of FIGS. 1A-1B. Accordingly, the selectable one-way torque transmitting mechanism 110 may be used as a clutch or a brake in an automotive transmission. The torque transmitting mechanism 110 includes an outer race 112. The outer race 112 is annular in shape and includes an inner surface 114. A plurality of recesses or pockets 116 are formed in the inner surface 114 and are spaced annularly around the inner perimeter of the outer race 112. An annular groove 118 (see FIG. 3B) is formed in the inner surface 114 of the outer race 112. The annular groove 118 extends around the inner circumference of the outer race 112 and through each of the pockets 116. The groove 118 is formed into the outer race 112 at a depth greater than the depth of the pockets 116.

The torque transmitting device 110 also includes an inner race 120 disposed radially inward from the outer race 112. The outer race 112 is disposed concentrically around the inner race 120. The inner race 120 also has a generally annular shape. The inner race 120 has a plurality of recesses or pockets 122 formed in an outer surface 124 of the inner race 120. The pockets 122 are spaced annularly around the outer circumference of the inner race 120.

A first locking element 126 and a second locking element 128 are disposed within each pocket 122 of the inner race 120. The locking elements 126, 128 may be rockers, sprags, or any other suitable type of locking element 126, 128. In the illustrated embodiment, each of the locking elements 126, 128 includes a pivot body 130, 131 and an arm 132, 133 extending from the pivot body 130, 131. The pivot bodies 130, 131 are pivotally connected to the inner race 120 within the pockets 122. Thus, the pivot bodies 130, 131 remain within the pockets 122 of the inner race 120, but the arms 132, 133 may be rotated about the pivot points A, B such that the arms 132, 133 extend out of the pockets 122 and toward the outer race 112. In some positions of the torque transmitting device 110, the arms 132, 133 extend into the pockets 116 of the outer race 112, while in other positions, the arms 132, 133 are disposed outside of the pockets 116. As will be described in further detail below, the locking elements 126, 128 are designed to selectively transmit torque through the torque transmitting device 110.

A plurality of biasing members 134 is disposed within the pockets 122 of the inner race 120. In the present example the biasing members 134 are coil springs, but it should be appreciated that various other types of biasing members may be employed. Each biasing member 134 engages one of the arms 132, 133 and urges the arm 132, 133 of the locking element 126, 128 to rotate outward and away from the central axis C of the torque transmitting device 110. In the present example, the first locking element 126 is illustrated as being biased in a counterclockwise direction about the pivot axis A and the second locking element 128 is illustrated as being biased in a clockwise direction about the pivot axis B, but it should be appreciated that the locking elements 126, 128 and biasing members 134 may be oriented in an opposite direction, if desired.

An annular-shaped control rail 136 is disposed adjacent to the inner and outer races 120, 112. The control rail 136 is disposed within the annular groove 118 of the outer race 112 and extends radially inwardly from the annular groove 118. The control rail 136 has a plurality of recesses or indentations 138 formed in an inner surface 140 of the control rail 136. The indentations 138 are spaced apart around the inner circumference of the annular control rail 136. The indentations 138 are separated by protrusions 142 that are spaced around the inner circumference of the control rail 136. Each protrusion 142 has a first ramped surface 144 extending from a first side 146 of the protrusion 142 and a second ramped surface 148 extending from a second side 150 of the protrusion 142. Each protrusion 142 has a concave arcuate middle surface 152 disposed between the first and second ramped surfaces 144, 148. Each ramped surface 144, 148 extends at an acute angle α from the arcuate middle surface 152. The indentations 138 are located adjacent to the ramped surface 144, 148 of the protrusions 142. Though a specific description of the protrusions 142 has been given in this paragraph, it should be understood, however, that the protrusions 142 could have other configurations, without falling beyond the spirit and scope of the present disclosure.

The control rail 136 is partially disposed within the annular groove 118 and may be slid within the annular groove 118 to rotationally translate the control rail 136 with respect to the inner race 112. The control rail 136 may be rotationally moved by an actuator, by way of example. In FIGS. 3A-3B, the control rail 136 is illustrated disposed in a position wherein the control rail 136 prevents the locking elements 126, 128 from rotating into the pockets 116 of the outer race 112.

Torque is transmitted through the torque transmitting device 110 in a similar manner to the torque transmitting device 10 of FIGS. 1A-1B, and the four positions described in FIGS. 2A-2D are also applicable to the torque transmitting device 110 of FIGS. 3A-3B. Accordingly, torque is transmitted through the torque transmitting device 110 when the outer race 112 is rotationally fixed to the inner race 120 by either or both of the first and second locking elements 126, 128 engaging the outer race 112. For example, when the first locking element 126 moves into one of the pockets 116 by the spring force of the biasing element 134, the first locking element 126 engages the outer race 112 in that pocket 116 of the outer race 112. When the first locking element 126 is biased into the pocket 116, the first locking element 126 fixes the inner race 120 to the outer race 112 in one rotational direction to transfer torque between the inner and outer races 120, 112.

In a transmission, the inner and outer races 120, 112 would each be coupled to other components, such as shafts, such that when the races 120, 112 are coupled together, torque is transmitted between the shafts connected to the races 120, 112. In the embodiment of FIGS. 3A-3B, when the first locking element 126 is allowed to be biased into one of the pockets 116 (when the protrusions 142 of the control rail 136 are slid out of the way of the pocket 116), the outer and inner races 112, 120 are fixed together for common rotation in one direction, but not the opposite direction. Thus, the outer race 112 is prevented from rotating in a counterclockwise direction, but it may freely rotate in a clockwise direction, in the orientation of FIG. 3A. Thus, engagement by the first locking elements 126 into the pockets 116 rotationally fixes the inner race 120 and the outer race 112 together in one direction. Disengagement of the first locking elements 126 to the outer race 120 occurs when the control rail 136 is slid around the annular groove 118 such that the protrusions 142 overlap with and block the pockets 116, pushing the first locking elements 126 out of the pockets 116 (as shown in FIG. 3A).

Torque may also or alternatively be transmitted through the torque transmitting device 110 when the inner race 120 is rotationally fixed to the outer race 112 by the second locking elements 128 engaging the outer race 112. For example, when the second locking elements 128 move into one of the pockets 116 by the spring force of the biasing element 134 (when the protrusions 142 are not overlapping with the pockets 116 adjacent to the second locking elements 128), the second locking elements 128 engage the outer race 112 in the adjacent pockets 116 of the outer race 112. When one or more of the second locking elements 128 are biased into the pocket(s) 116, the second locking element(s) 128 fix the inner race 120 to the outer race 112 in one rotational direction to transfer torque between the inner and outer races 120, 112. In the embodiment of FIG. 3A, when a second locking element 128 is biased into one of the pockets 116 (when the protrusions 142 of the control rail 136 are slid out of the way of the pockets 116), the outer and inner races 112, 120 are fixed together for common rotation in one direction, but not the opposite direction. The outer race 112 is prevented from rotating in a clockwise direction, but it may freely rotate in a counterclockwise direction, in the orientation of FIG. 3A. Thus, engagement by the second locking elements 128 into the pockets 116 rotationally fixes the outer race 112 and the inner race 120 together in one direction. Disengagement of the second locking elements 128 to the outer race 112 occurs when the control rail 136 is slid around the annular groove 118 such that the protrusions 142 overlap with and block the pockets 116, or a portion of the pockets 116, and push the second locking elements 128 out of the pockets 116.

In sum, the first locking elements 126 transfer torque between the inner and outer races 120, 112 by coupling them together when the outer race 112 is rotated in a counterclockwise direction (in the orientation of FIG. 3A), but the first locking elements 126 do not prevent the outer race 112 from rotating in a clockwise direction. The second locking elements 128 transfer torque between the inner and outer races 120, 112 by coupling them together when the outer race 112 is rotated in a clockwise direction (in the orientation of FIG. 3A), but the second locking elements 128 do not prevent the outer race 112 from rotating in a counterclockwise direction. The control rail 136 is used as shown in FIGS. 2A-2D to selectively apply the first and second locking elements 126, 128. In other words, the control rail 136 may be slid so that the torque transmitting device 110 transfers torque in one, both, or neither rotational directions, as described above with respect to FIGS. 2A-2D.

The description of the invention is merely exemplary in nature and variations that do not depart from the gist of the invention are intended to be within the scope of the invention. Such variations are not to be regarded as a departure from the spirit and scope of the invention. For example, the various features shown and described may be combined in any suitable manner.

What is claimed is:

1. A torque transmitting device for use in an automotive transmission, the torque transmitting device comprising:
   a first annular race;
   a second annular race disposed concentrically around the first annular race;
   a first locking element pivotally connected to one of the first and second annular races, the first locking element being moveable to rotationally fix the first annular race to the second annular race in a first rotational direction to transfer torque therebetween;
   a second locking element pivotally connected to one of the first and second annular races, the second locking element being moveable to rotationally fix the first annular race to the second annular race in a second rotational direction to transfer torque therebetween, the second rotational direction being opposite the first rotational direction; and
   a control rail disposed adjacent to the first and second annular races, the control rail forming a plurality of indentations therein, the control rail moveable between first, second, third, and fourth positions, wherein
   in the first position, the first locking element is partially disposed in an indentation of the plurality of indentations of the control rail and the second locking element is partially disposed in an indentation of the plurality of indentations of the control rail;
   in the second position, the first locking element is partially disposed in an indentation of the plurality of indentations of the control rail and the second locking element is disposed outside of the plurality of indentations of the control rail;
   in the third position, the first and second locking elements are disposed outside of the plurality of indentations of the control rail; and
   in the fourth position, the first locking element is disposed outside the plurality of indentations of the control rail and the second locking element is partially disposed in an indentation of the plurality of indentations of the control rail.

2. The torque transmitting device of claim 1, wherein the control rail has at least one protrusion separating the indentations of the plurality of indentations.

3. The torque transmitting device of claim 2, wherein the protrusion has first and second sides, the protrusion having a first ramped surface on the first side and a second ramped surface on the second side, the protrusion having a flat middle surface disposed between the first and second ramped surfaces.

4. The torque transmitting device of claim 3, wherein the first ramped surface extends at an acute angle from the middle surface and the second ramped surface extends at an acute angle from the middle surface.

5. The torque transmitting device of claim 4, wherein one of the first and second annular races defines an annular groove therein, the control rail being partially disposed in the annular groove.

6. The torque transmitting device of claim 5, further comprising:
   a first biasing element configured to bias the first locking element toward one of the first and second annular races; and
   a second biasing element configured to bias the second locking element toward one of the first and second annular races.

7. The torque transmitting device of claim 6, wherein the first and second locking elements are pivotally attached to the second annular race, the first annular race having an inner surface forming a plurality of pockets, the first and second locking elements each being moveable to engage a pocket of the plurality of pockets to transmit torque between the first annular race and the second annular race.

8. The torque transmitting device of claim 7, wherein the first locking element has a first extending arm biased to pivot towards the first annular race, the first extending arm engaging a first pocket of the plurality of pockets to rotationally fix the first annular race to the second annular race to transmit torque therebetween, the first extending arm being configured to be rotated out of the first pocket to refrain from transmitting torque between the first annular race and second annular race, the control rail being configured to push the first locking element out of the first pocket when the control rail is moved into one of the third and fourth positions.

9. The torque transmitting device of claim 8, wherein the second locking element has a second extending arm biased to pivot towards the first annular race, the second extending arm engaging a second pocket of the plurality of pockets to rotationally fix the first annular race to the second annular race to transmit torque therebetween, the second extending arm being configured to be rotated out of the second pocket to refrain from transmitting torque between the first annular race and second annular race, the control rail being configured to push the second locking element out of the second pocket when the control rail is moved into one of the second and third positions.

10. The torque transmitting device of claim 7, wherein the first locking element is configured to prevent rotation between the first and second annular races in the first rotational direction when the first locking element is partially disposed in the first pocket, the first locking element not preventing rotation between the first and second annular races in the second rotational direction when the first locking element is partially disposed in the first pocket, the second locking element being configured to prevent rotation between the first and second annular races in the second rotational direction when the second locking element is partially disposed in the second pocket, the second locking element not preventing rotation between the first and second annular races in the first rotational direction when the second locking element is partially disposed in the second pocket.

11. The torque transmitting device of claim 1, wherein:
in the first position, the first and second annular races are fixed together for common rotation in the first and second rotational directions;
in the second position, the first and second annular races are fixed together for common rotation in the first rotational direction, the first and second annular races being moveable with respect to each other in the second rotational direction;
in the third position, the first and second annular races are movable with respect to each other in the first and second rotational directions; and
in the fourth position, the first and second annular races are moveable with respect to each other in the first rotational direction, the first and second annular races being fixed together for common rotation in the second rotational direction.

12. A torque transmitting device for use in an automotive transmission, the torque transmitting device comprising:
a first annular race;
a second annular race disposed concentrically around the first annular race, wherein one of the first and second annular races defines an annular groove therein;
a first locking element pivotally connected to one of the first and second annular races, the first locking element moveable to rotationally fix the first annular race to the second annular race in a first rotational direction to transfer torque therebetween;
a second locking element pivotally connected to one of the first and second annular races, the second locking element moveable to rotationally fix the first annular race to the second annular race in a second rotational direction to transfer torque therebetween, the second rotational direction being opposite the first rotational direction; and
an annular control rail disposed in the annular groove, the annular control rail forming a plurality of indentations therein, the annular control rail being moveable within the groove to prevent one or both of the first and second locking elements from rotationally fixing the first annular race to the second annular race.

13. The torque transmitting device of claim 12, wherein the annular control rail has at least one protrusion separating the indentations of the plurality of indentations, the protrusion having first and second sides, the protrusion having a first ramped surface on the first side and a second ramped surface on the second side.

14. The torque transmitting device of claim 12, wherein the protrusion has a middle surface disposed between the first and second ramped surfaces, the first ramped surface extending at an acute angle from the middle surface and the second ramped surface extending at an acute angle from the middle surface.

15. The torque transmitting device of claim 14, wherein the first and second locking elements are pivotally attached to the second annular race, the first annular race having an inner surface forming a plurality of pockets, the first and second locking elements each being moveable to engage a pocket of the plurality of pockets to transmit torque between the first annular race and the second annular race.

16. The torque transmitting device of claim 15, wherein the first locking element is configured to prevent rotation between the first and second annular races in the first rotational direction when the first locking element is partially disposed in the first pocket, the first locking element not preventing rotation between the first and second annular races in the second rotational direction when the first locking element is partially disposed in the first pocket, the second locking element being configured to prevent rotation between the first and second annular races in the second rotational direction when the second locking element is partially disposed in the second pocket, the second locking element not preventing rotation between the first and second annular races in the first rotational direction when the second locking element is partially disposed in the second pocket.

17. A torque transmitting device for use in an automotive transmission, the torque transmitting device comprising:
a first annular race;
a second annular race disposed concentrically around the first annular race;
a first locking element pivotally connected to one of the first and second annular races, the first locking element being moveable to rotationally fix the first annular race to the second annular race in a first rotational direction to transfer torque therebetween;
a second locking element pivotally connected to one of the first and second annular races, the second locking element being moveable to rotationally fix the first annular race to the second annular race in a second rotational direction to transfer torque therebetween, the second rotational direction being opposite the first rotational direction; and
an annular control rail disposed adjacent to the first annular race and the second annular race, the annular control rail having at least one protrusion extending therefrom, the protrusion having a first ramped surface on a first side and a second ramped surface on a second side, the annular control rail forming a first indentation adjacent to the first ramped surface and a second indentation adjacent to the second ramped surface, the annular control rail moveable to prevent the first and second locking elements from rotationally fixing the first annular race to the second annular race.

18. The torque transmitting device of claim 17, wherein the annular control rail is moveable between first, second, third, and fourth positions, wherein
in the first position, the first locking element is partially disposed in the first indentation of the annular control rail to fix the first and second annular races for common rotation together in the first rotational direction, the second locking element being partially disposed in the second indentation of the annular control rail to fix the first and second annular races for common rotation together in the second rotational direction;

in the second position, the first locking element is partially disposed in the first indentation of the annular control rail to fix the first and second annular races for common rotation together in the first rotational direction, the second locking element being disposed outside of the second indentation of the annular control rail such that the first and second annular races are moveable with respect to each other in the second rotational direction;

in the third position, the first and second locking elements are disposed outside of the first and second indentations of the annular control rail such that the first and second annular races are movable with respect to each other in the first and second rotational directions; and in the fourth position, the first locking element is disposed outside of the first indentation of the annular control rail such that the first and second annular races are moveable with respect to each other in the first rotational direction, the second locking element being partially disposed in the second indentation of the annular control rail to fix the first and second annular races for common rotation together in the second rotational direction.

19. The torque transmitting device of claim 18, wherein the at least one protrusion has a middle surface disposed between the first and second ramped surfaces, the first ramped surface extending at an acute angle from the middle surface and the second ramped surface extending at an acute angle from the middle surface, one of the first and second annular races defining an annular groove therein, the annular control rail being partially disposed within the annular groove.

20. The torque transmitting device of claim 19, wherein the first and second locking elements are pivotally attached to the second annular race.

\* \* \* \* \*